UNITED STATES PATENT OFFICE.

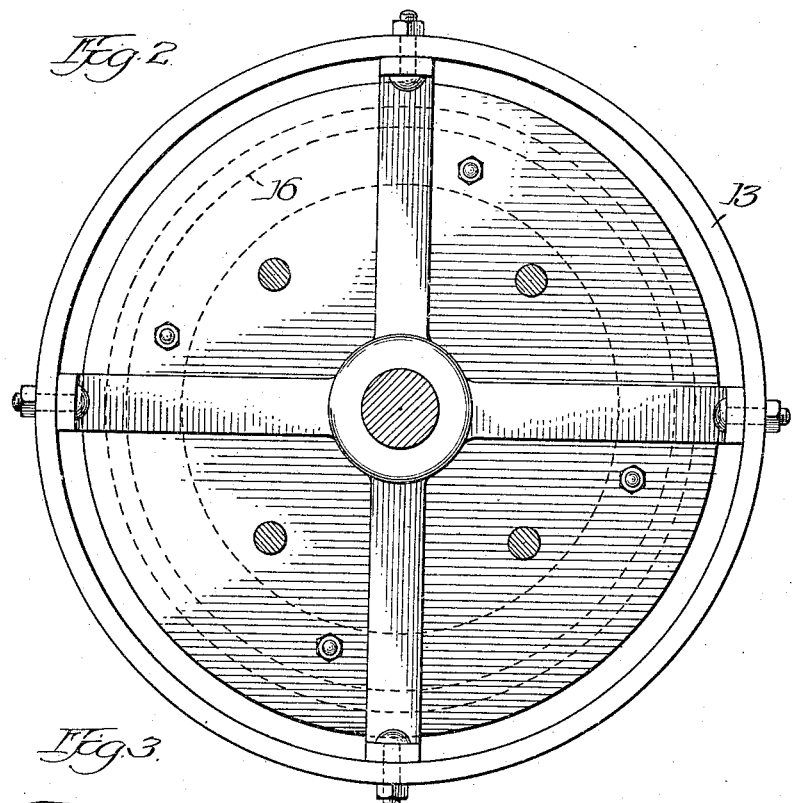
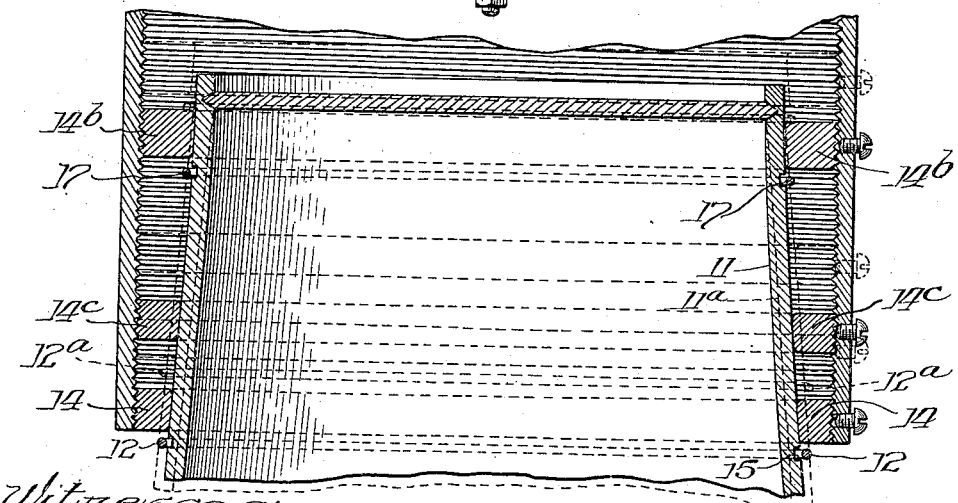

HORACE J. SCOTT, OF HILL CITY, MINNESOTA.

APPLYING HOOPS.

1,228,976.  Specification of Letters Patent.  Patented June 5, 1917.

Application filed April 6, 1916. Serial No. 89,275.

*To all whom it may concern:*

Be it known that I, HORACE J. SCOTT, a subject of the King of England, residing at Hill City, in the county of Aitkin and State of Minnesota, have invented certain new and useful Improvements in Applying Hoops, of which the following is a specification.

In the applying of flat or band hoops to pails it is customary to drive the same to their place on the exterior surface of the pail, the thickness of the hoop not being sufficient to form an objectionable obstruction or to interfere with the pasting of labels or the applying of a wrapping thereover; but where a wire hoop is used the thickness of the same renders it desirable that the hoops be seated within an annular recess or groove so that the hoops shall not project beyond the general surface of the pail exterior. In the application of hoops by seating in a groove, it has been deemed necessary to use a length of wire instead of an endless hoop, twisting the ends together and cutting off the surplus length, the use of a welded or endless wire hoop being heretofore impracticable for seating in a recess by reason of the fact that if driven on until it reaches the recess or groove its internal diameter will be that of the external diameter of the pail and therefore greater than the groove and it will not seat within the latter.

By the present invention an endless wire hoop is seated snugly within a groove of the pail, the formed pail being contracted by pressure inwardly applied until its diameter adjacent the groove is reduced to correspond to the inner diameter of the hoop, whereby the hoop is permitted to slip into place and the pail is then allowed to expand to its original diameter with the hoop tightly seated in the groove. The hoop, not having been driven, is not strained and as its inner diameter corresponds to that of the bottom of the recess, it fits tightly therein and securely confines the pail stays.

In order that the invention may be readily understood the carrying out of the same is set forth in detail hereinafter and a preferred form of device embodying the same together with a modification thereof is shown in the attached drawings, wherein—

Fig. 2 is a transverse section on the line 2—2 of Fig. 1; and

Fig. 3 is a central vertical section through a slight modification.

Figure 1:
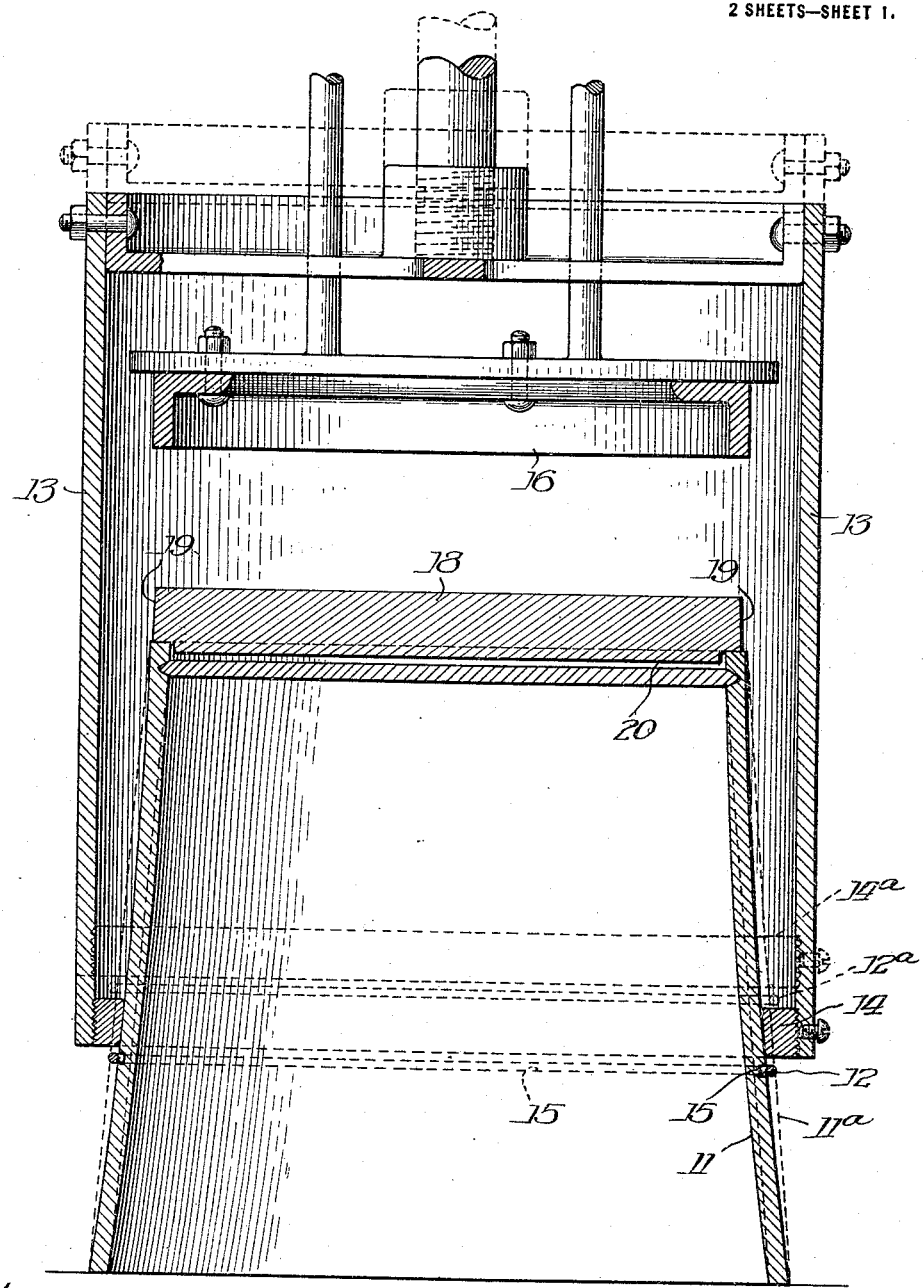
Figure 1 is a vertical section through the device as applied in the hooping of a pail.

By way of illustration an ordinary butter or lard pail is indicated at 11, the normal outline of the same being indicated in dotted lines at 11$^a$. The pail having been placed upon a suitable platform or table the endless wire hoop, usually electrically welded, is dropped over the smaller end of the pail and by gravity falls until it reaches a point where the interior diameter of the hoop corresponds to the exterior diameter of the pail where it comes to rest. This hoop is indicated at 12 in its relation to the compressed pail and at 12$^a$ in the position to which it will drop by gravity before the pail is compressed. The compressing plunger 13 is then lowered over the pail until the compressing ring 14 reaches the position shown in dotted lines at 14$^a$ just behind the hoop 12$^a$. Any further advance of the compressing ring 14 will diametrically contract the walls of the pail so as to permit the hoop to drop in advance of the compressing ring until the hoop 12 and the compressing ring 14 reach the position shown in full lines in Fig. 1. The hoop 12 is now in a position corresponding to the groove 15. Thereupon the dislodging plunger 16 is brought into play and lowered against the bottom of the pail 11 pushing the same from the grasp of the compressing ring 14 as the latter is retracted; or obviously, the compressing plunger 13 may be withdrawn carrying the pail with it until its bottom strikes the stationary dislodging plunger 16 which arrests the upward movement of the pail and causes the same to be discharged from the compressing plunger. As the pail is progressively pushed from the grasp of the compressing ring 14 its walls will expand to their original diameter, the hoop 12 entering the groove 16 and becoming firmly seated therein.

It will be observed that in this operation the hoop has not been driven and consequently has been subjected to no strain. It retains its original diameter and the pail having resumed its original or normal diameter, the staves are firmly held in position by the endless hoop 12.

That form of the device shown in Fig. 3 is substantially the same as that above described with the exception that means are shown connected with the device for assembling two endless hoops with a pail provided with two hoop-receiving grooves. In this form of construction, in addition to the compressing ring 14 arranged to follow the hoop 12 and compress the pail therefor an additional compressing ring 14ᵇ is used to follow the hoop 17 and a third compressing ring 14ᶜ is arranged to act in advance of the hoop 17.

It will be observed that the compressing rings 14 and 14ᵇ arranged to follow and to compress the pail for the hoop have an interior diameter less than that of the inner diameter of the hoops themselves, and that where a compressing ring 14ᶜ is employed its diameter must be greater than the exterior diameter of the hoop 17 in order that it may clear the same as it is applied to the pail.

Under some conditions, as when applying endless hoops to a "stub" or pail having but little flare, there is difficulty in quickly placing the hoop over the smaller end preliminary to applying. In these circumstances, I use a leader or guide 18 (Fig. 1) the body of which overlies the pail bottom and has oblique faces 19 arranged to guide the hoop on to the pail. The guiding member has also a reduced portion 20 which enters into the space between the bottom of the staves and serves to center the guiding member in position.

The use of the term "endless" as applied to hoops is not intended as a limitation to welded hoops, but as defining a hoop formed previous to application by the joining of the ends in any suitable manner. Neither is the invention limited to the application in a groove of a plain wire hoop, but contemplates the application of endless hoops, whether of plain or corrugated wire or other suitable material.

I claim:

1. The method of hooping pails and the like provided with staves having a hoop-receiving groove, which consists in diametrically contracting the assembled staves of the formed pail, placing the hoop in the groove, and then permitting the pail staves to expand upon the hoop.

2. The method of hooping tapering pails and the like provided with a hoop-receiving groove, which consists in dropping an endless hoop over the smaller end of the pail, compressing the pail diametrically by pressure applied progressively toward the larger diameter to reduce its diameter and permit the hoop to advance to a position on the pail corresponding to the groove and then withdrawing the pressure and permitting the pail to expand to its normal size with the hoop in the groove.

3. The method of hooping tapering pails and the like provided with a hoop-receiving groove, which consists in dropping an endless hoop over the smaller end of the pail, compressing the pail diametrically by pressure applied behind the hoop to progressively reduce its diameter and permit the hoop to advance to a position on the pail corresponding to the groove, and then withdrawing the pressure and permitting the pail to expand to its normal size with the hoop in the groove.

4. The method of hooping tapering pails and the like provided with a hoop-receiving groove, which consists in supporting the pail with its axis substantially vertical, dropping an endless hoop over the smaller end of the pail, compressing the pail diametrically by pressure applied behind the hoop and progressively toward the larger diameter to reduce its diameter and permit the hoop to advance by gravity to a position on the pail corresponding to the groove, and then withdrawing the pressure and permitting the pail to expand to its normal size with the hoop in the groove.

5. An improved device for applying endless hoops in circumferential grooves of tapering pails and the like comprising annular compressing means, the inner diameter of said means being no greater than the diameter of the bottom of the groove, means to advance the compressing means progressively from the small end of the pail toward the groove to contract the pail diametrically, and means to withdraw the pail from the action of the compressing means to permit the pail to expand upon the hoop.

6. An improved device for applying endless hoops in circumferential grooves of tapering pails and the like comprising annular compressing means, the inner diameter of said means being less than the diameter of the bottom of the groove by a distance corresponding substantially to the depth of the groove, means to advance the compressing means progressively from the small end of the pail toward the groove to contract the pail diametrically, and means to withdraw the pail from the action of the compressing means to permit the pail to expand upon the hoop.

7. An improved device for applying endless hoops in circumferential grooves of tapering pails and the like comprising annular compressing means, the inner diameter of said means being no greater than the diameter of the bottom of the groove, a tapered member for guiding the hoop on to the smaller end of the pail, means to advance the compressing means progressively from the small end of the pail toward the groove to contract the pail diametrically, and means to withdraw the pail from the action of the compressing means to permit the pail to expand upon the hoop.

In testimony whereof I have hereunto signed my name in the presence of two subscribing witnesses.

HORACE J. SCOTT.

Witnesses:
JOSEPH L. DIVELL,
HAROLD J. EVANS.